US009475619B2

(12) United States Patent
Procter

(10) Patent No.: US 9,475,619 B2
(45) Date of Patent: Oct. 25, 2016

(54) BEVERAGE CONTAINER SEALING LID

(76) Inventor: Andrew John Procter, Goodna (AU)

( * ) Notice: Subject to any disclaimer, the term of this patent is extended or adjusted under 35 U.S.C. 154(b) by 113 days.

(21) Appl. No.: 13/701,518

(22) PCT Filed: Jun. 2, 2011

(86) PCT No.: PCT/AU2011/000683
§ 371 (c)(1),
(2), (4) Date: Dec. 3, 2012

(87) PCT Pub. No.: WO2011/150456
PCT Pub. Date: Dec. 8, 2011

(65) Prior Publication Data
US 2013/0068765 A1   Mar. 21, 2013

(30) Foreign Application Priority Data
Jun. 3, 2010 (AU) ................ 2010902493

(51) Int. Cl.
A47G 19/22 (2006.01)
B65D 43/02 (2006.01)
(Continued)

(52) U.S. Cl.
CPC .......... B65D 43/02 (2013.01); B29C 45/1639 (2013.01); B29C 45/1676 (2013.01); B65D 43/0212 (2013.01); B65D 43/0222 (2013.01);
(Continued)

(58) Field of Classification Search
CPC ......... B65D 43/0212; B65D 47/0847; B65D 51/20; B65D 43/02; B65D 43/0235; B65D 55/06; B65D 43/0222; B65D 2251/0021; B65D 2251/0081; B65D 81/3876; B65D 51/007; B65D 2251/08; B65D 2203/00; B65D 2543/00638; B65D 2543/00092; B65D 2543/00962; B65D 2543/00527; B65D 2543/00046; B65D 2543/00518; B65D 2543/00296; B65D 2543/00796; B65D 2543/00685; B65D 2543/00555; A47G 23/0216; A47G 23/0208; B29C 45/1639; B29C 45/1676; B29C 2045/0056; B29L 2031/565
USPC ........... 220/287, 254.3, 719, 729, 740, 906, 220/737–743, 703; 222/556
See application file for complete search history.

(56) References Cited

U.S. PATENT DOCUMENTS 3,263,806 A * 8/1966 Ring ............................. 206/427
3,850,341 A * 11/1974 Bart ............................. 220/212
(Continued)

FOREIGN PATENT DOCUMENTS

FR   2736620 A1 *  1/1997

OTHER PUBLICATIONS

English translation of Aichert FR 2736620. Espacenet May 1, 2015.*

Primary Examiner — James N Smalley
(74) Attorney, Agent, or Firm — Michael D. Eisenberg

(57) ABSTRACT

A beverage container sealing lid includes a pouring aperture with a hinged closure arranged to seal the aperture. An engagement assembly is located on an inside of the lid and has first and second engagement means. The first and second engagement means include first and second concentric recesses formed on an inside of the lid for engagement with beverage containers having can ends of corresponding first and second diameters. A skirt depends downward about the lid for a sufficient distance to provide an area for the skirt to bear markings such as logos, slogans, indicia and the like.

12 Claims, 15 Drawing Sheets

(51) Int. Cl.
*B65D 47/08* (2006.01)
*B65D 51/20* (2006.01)
*B65D 51/00* (2006.01)
*B65D 55/06* (2006.01)
*B29C 45/16* (2006.01)
*B29L 31/56* (2006.01)
*B29C 45/00* (2006.01)

(52) U.S. Cl.
CPC ....... *B65D 43/0235* (2013.01); *B65D 47/0847* (2013.01); *B65D 51/007* (2013.01); *B65D 51/20* (2013.01); *B65D 55/06* (2013.01); *B29C 2045/0056* (2013.01); *B29L 2031/565* (2013.01); *B65D 2101/0007* (2013.01); *B65D 2203/00* (2013.01); *B65D 2251/08* (2013.01); *B65D 2543/00046* (2013.01); *B65D 2543/00092* (2013.01); *B65D 2543/00296* (2013.01); *B65D 2543/00518* (2013.01); *B65D 2543/00527* (2013.01); *B65D 2543/00555* (2013.01); *B65D 2543/00638* (2013.01); *B65D 2543/00685* (2013.01); *B65D 2543/00759* (2013.01); *B65D 2543/00796* (2013.01); *B65D 2543/00962* (2013.01)

(56) References Cited

U.S. PATENT DOCUMENTS

| | | | | |
|---|---|---|---|---|
| 4,487,324 | A * | 12/1984 | Ostrowsky | 215/253 |
| 4,615,463 | A * | 10/1986 | Price et al. | 220/592.17 |
| 4,861,301 | A * | 8/1989 | Pomeroy et al. | 441/131 |
| 4,949,865 | A * | 8/1990 | Turner | B65D 47/0847 220/254.3 |
| 5,110,002 | A * | 5/1992 | Tucker | 220/254.3 |
| 5,123,561 | A * | 6/1992 | Gross | 222/153.07 |
| 5,203,467 | A * | 4/1993 | Tucker | 220/254.3 |
| 5,261,554 | A * | 11/1993 | Forbes | 220/592.16 |
| 5,740,940 | A * | 4/1998 | Weiss | 220/592.25 |
| 5,839,596 | A * | 11/1998 | Zahn et al. | 220/256.1 |
| 2003/0178433 | A1* | 9/2003 | Adams | 220/703 |
| 2008/0217346 | A1* | 9/2008 | Rush et al. | 220/712 |

* cited by examiner

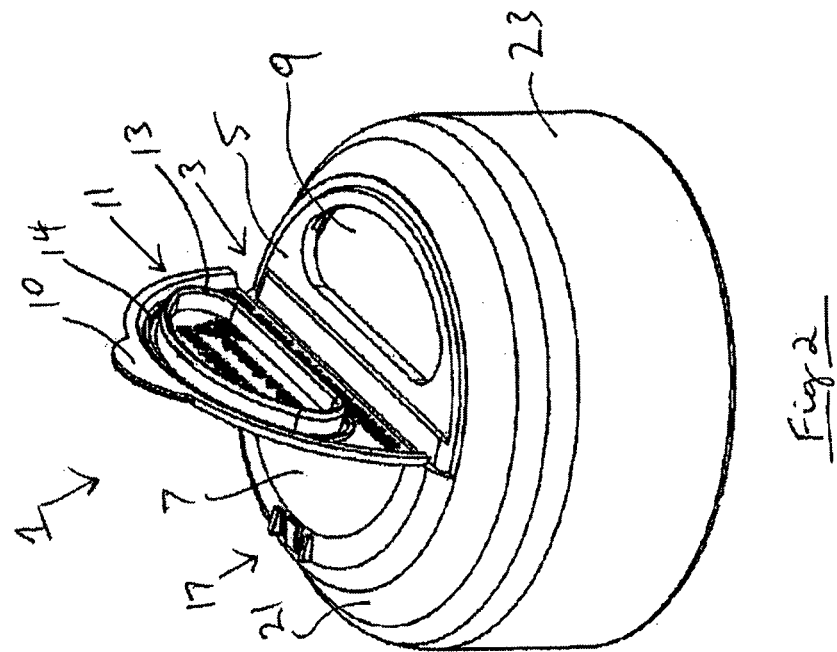
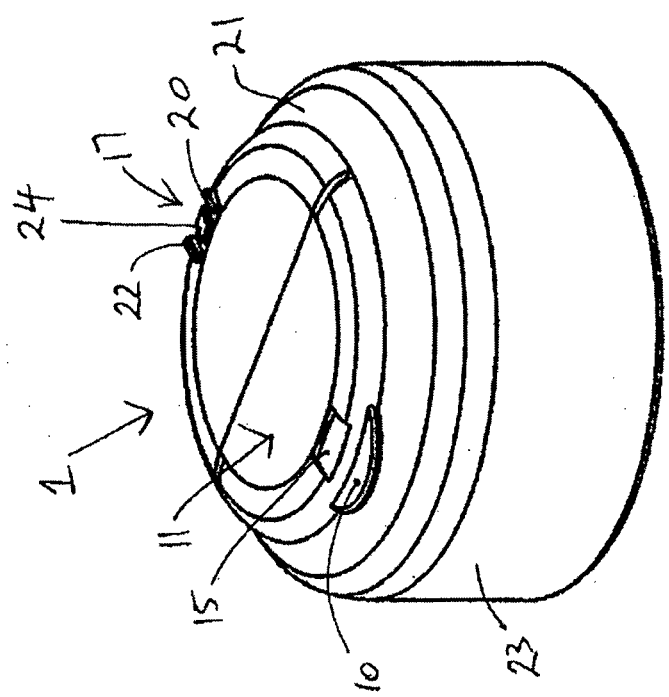

US 9,475,619 B2

BEVERAGE CONTAINER SEALING LID

TECHNICAL FIELD

The present invention relates to a lid for beverage cans. In a preferred embodiment the lid bears logos and/or marketing or advertising material. In particular, the lid may be used in situations where sports fans wish to display their loyalty to a particular club or team.

BACKGROUND

Beverage containers, such as coffee cups, including takeaway coffee cups and metal beer and soft drink cans are prone to spillage. This may occur when people are walking with the container or traveling in cars for example.

As a particular example, supporters of sporting teams such as football, rugby, cricket and the like often imbibe canned beverages such as soft drinks and beers.

Where the situation is crowded there is a risk that a container of beverage may fall over so that the beverage is spilt.

Furthermore, from time to time supporters may wish to leave a can of beverage in the company of their fellows while they make a toilet break or purchase food. During that time it would be preferable if the beverage can could be conveniently resealed to prevent foreign objects such a flies, bugs, cigarette butts from contaminating the beverage Supporters of sporting clubs frequently dress in the colours of their teams and like to show support for their teams in other ways as well.

It would be advantageous if an apparatus was provided that assisted in meeting one or more of the above objectives and which was suitable for use with more than one size of commonly available beverage can.

SUMMARY OF THE INVENTION

According to a first aspect of the present invention, there is provided a beverage container sealing lid including:
  a pouring aperture;
  a hinged closure arranged to seal the aperture;
  an engagement assembly on an inside of said lid for engagement with beverage containers having can ends of first and second diameters; and
  a skirt for locating about the beverage container wherein the skirt depends downward for a distance so that an area is provided for the skirt to bear markings such as logos, slogans, indicia and the like.

In a first embodiment the first and second engagement means include first and second concentric recesses formed on an inside of said lid for engagement with beverage containers having can ends of corresponding first and second diameters.

Alternatively, in a further embodiment the engagement assembly may comprise a layer of soft plastic formed on the inside of said lid for sealing contact with the beverage container.

Preferably the lid includes a platform stepped with an upper tier and a lower tier wherein the pouring aperture is formed through the lower tier.

The hinged closure is preferably formed with a rim for snug reception within the aperture.

An O-ring of elastomeric material may be retained around the rim for improved sealing.

As mentioned, the hinged closure may be formed with a rim for snug reception with the aperture and the layer of soft plastic is preferably formed to extend into the aperture for sealing contact with an outside of the rim in a closed configuration.

Preferably a shoulder extends downward and outward from the platform.

The skirt preferably depends from the shoulder.

In a preferred embodiment of the invention an outer side of the skirt bears indicia.

A retaining arrangement may be provided for holding the hinged closure open.

Preferably the retaining arrangement includes a first part formed on the hinged closure to cooperate with a second part of said arrangement formed upon an outside of said lid.

For example, the retaining arrangement preferably includes diverging wings formed on the hinged closure or an outside of the lid and a complementary recess formed on the outside of the lid or the hinged closure.

A beverage container sealing lid including at least one fastening formation about the skirt for engagement with a container for the beverage container.

The beverage container sealing lid may be fastened to the container for the beverage container with a bayonet connection.

The beverage container sealing lid may include a tamper indicator member having opposing portions fast with the container and having an intermediate portion taut over the hinged closure in a closed configuration.

The beverage container sealing lid may be provided in combination with a tubular web holder of clear material for presenting a web bearing indicia located therein.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1, is a perspective view of a beverage container lid in a closed configuration according to a preferred embodiment of the present invention.

FIG. 2, is a perspective view of the beverage container lid of FIG. 1 in a partially open configuration.

DETAILED DESCRIPTION OF PREFERRED EMBODIMENTS

Figure 3:
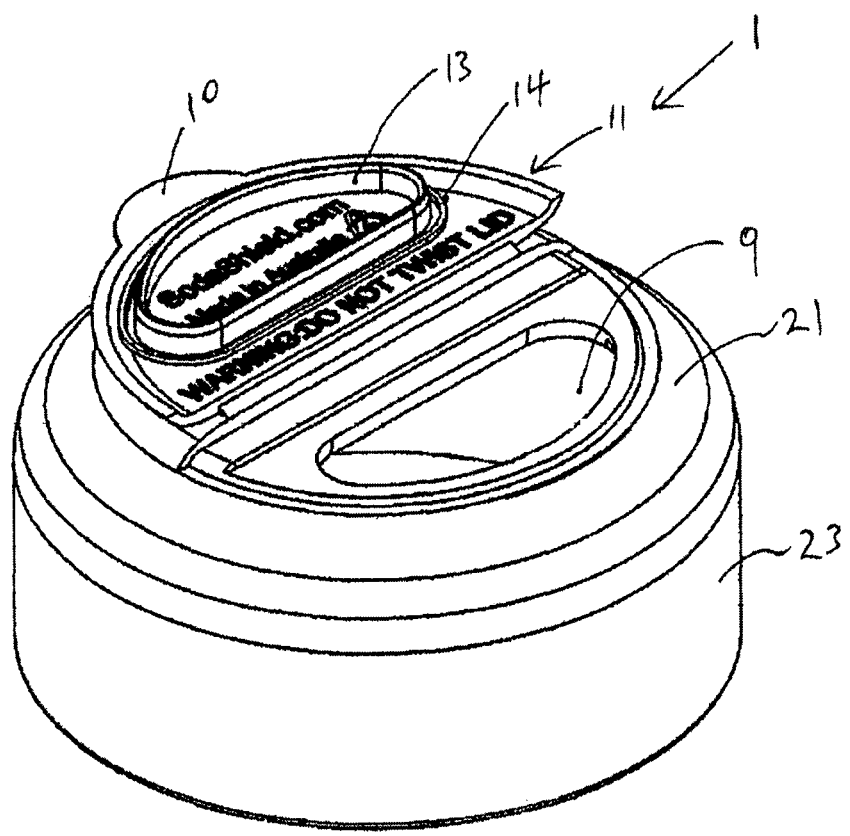
FIG. 3, is a perspective view of the beverage container lid of FIGS. 1 and 2 in a completely open configuration.

FIGS. 1, 2, and 3 are perspective views of a beverage can lid 1 according to a preferred embodiment of the present invention in each of a closed, partially open and completely open configuration, respectively.

Figure 4:
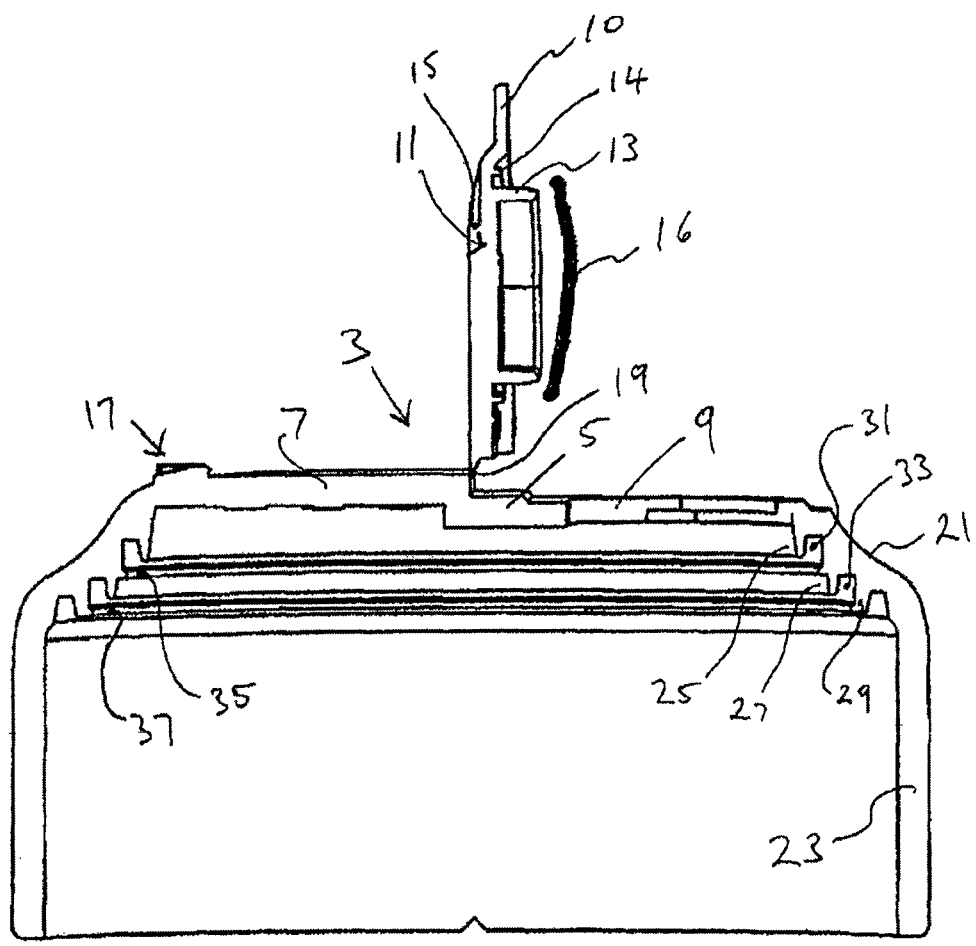
FIG. 4 is a cross section through the lid of FIG. 1 in a partially open configuration.
Figure 5:
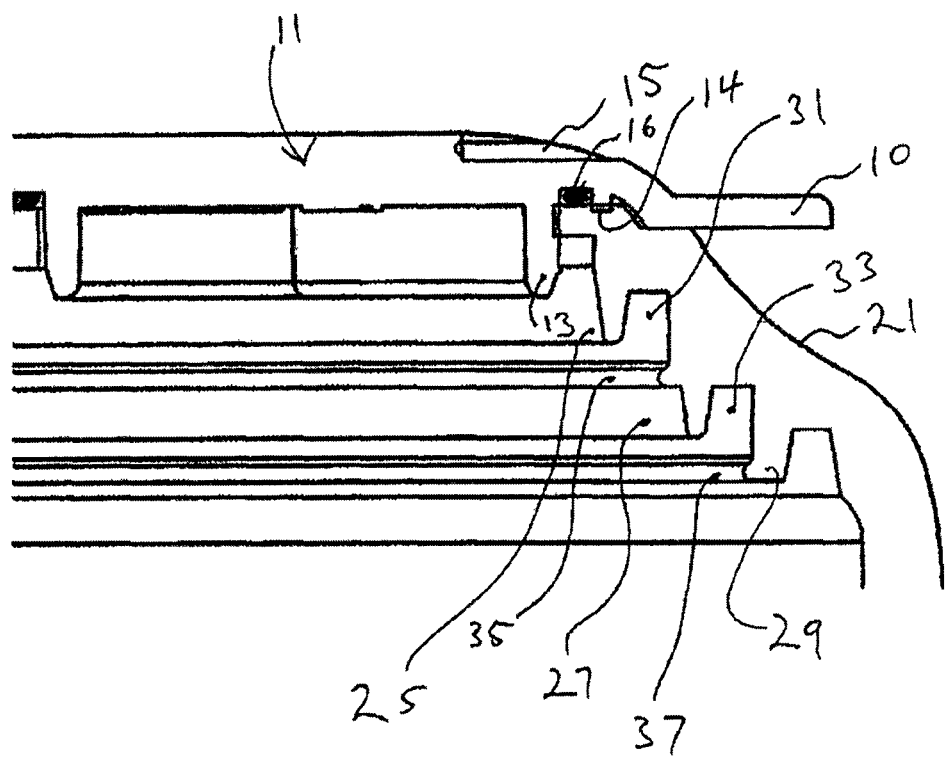
FIG. 5 is a detail of a cross section through the lid of FIG. 1 in a closed configuration.
Figure 6:
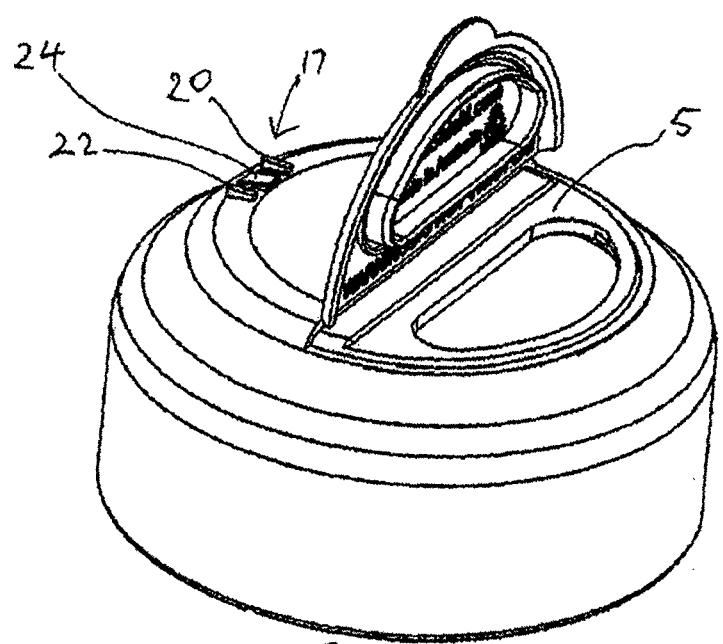
FIG. 6 is a further perspective view of the lid of FIG. 1 in a partially open configuration.
Figure 7:
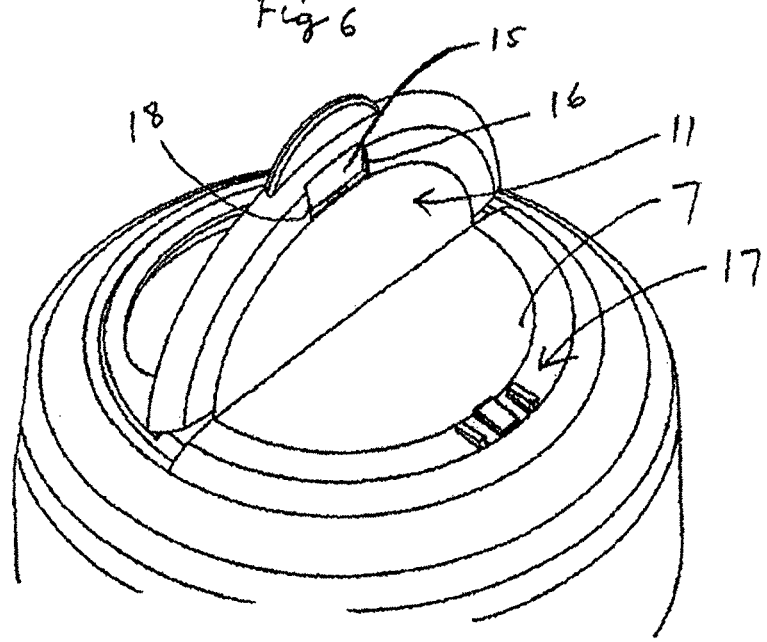
FIG. 7 is a further view of the lid as shown in FIG. 6 from a reverse camera position.

A cross section through the lid, in partially open configuration, is shown in FIG. 4. A detail through the lid in closed configuration is shown in FIG. 5.

With reference to FIGS. 2 and 4 the lid 1 includes a stepped central circular platform 3 comprised of a lower tier 5 and an upper tier 7. A D-shaped pouring aperture 9 is formed through the lower tier 5. A semicircular flap 11 is hinged along a join line 19 of lower tier 5 and upper tier 7 for closing over lower tier 5. Flap 11 is formed with an outer thumb tab 10 to assist in opening and closing the flap.

A D-shaped rim 13 extends from the underside of flap 11. The D-shaped rim 13 makes a snug fit within the internal walls of D-shaped opening 9 upon the flap 11 being closed over lower tier 5. A continuous wall 14 is formed about the outside of D-shaped rim 13 to form a gap therebetween into which is received an elastomeric O-ring 16 to thereby assist in sealing opening 9 upon closure of flap 11.

A plastic mesh may be formed under pouring aperture 9 to prevent contaminants from entering the can once the lid is in place and while flap 13 is opened. Furthermore vertical flow guides may be included that extend downward from around the pouring aperture 9 to improve the flow of beverage from the can through the pouring aperture.

Referring now to Figures A recess 15 is formed into the outer surface of flap 11. The recess 15 has opposed undercut sides 16, 18, i.e. the sides diverge outward as they penetrate into the material of flap 11. A complementary retaining formation 17 is located opposite on the periphery of the upper tier 7. The retaining formation 17 includes a pair of opposed, outwardly and upwardly diverging wings 20 and 22, which upon abutment with the outer edges of recess 15 flex inward so that they enter the recess 15 whereupon they flex outward and are engaged by the undercut sides 16, 18. Accordingly, the wings hold the surface flap 11 in a fully opened position until overcome by sufficient disengaging force applied to thumb tab 10. A protrusion extends upward between wings 20 and 22, though to a lesser height than that of the two wings, to act as a stop to thereby prevent wings 20 and 22 being damaged in the event that too much user force is applied as they engage with recess 15.

In the fully opened configuration shown in FIG. 3, the socket 15 is retained by plug 17 in order to hold flap 11 in the completely opened configuration.

Referring again to FIG. 4, it will be observed that a sloped concentric shoulder 21 extends outward and downward from the periphery of central platform 3. A ring like skirt 23 depends from the outer edge of shoulder 21.

Beverage cans are formed of a cylinder of sheet metal, usually aluminium. The can is closed at the top with a can end that consists of a circular piece of metal bearing a tab for opening and pouring of the beverage contained in the can. The can end is connected to the can cylinder by crimping the sides of the can to the periphery of the can end to form a circular upstanding crimping ridge. A small, circular indentation is located between the bottom of the crimping ridge and the surrounding can.

Can ends typically come in two sizes a large size and a small size so that the crimping ridge of the can will correspondingly either be of a larger diameter or a smaller diameter.

Referring again to FIG. 4 and also to FIG. 5, internally, three concentric rims 25, 27, 29 are formed about the inside of shoulder 21. Rims 25 and 27 define a small can end recess 31 therebetween to receive a small can end crimping ridge. A large can end recess 33 is provided between rims 27 and 29. The recesses 31 and 33 accommodate crimping ridges of small can ends and large can ends respectively. Lateral lips 35 and 37 extend inward from concentric rims 27 and 29 into recesses 31 and 33 respectively. The lips 35 and 37 engage the circular indentation that runs around the outside base of the crimping ridges of the can ends to thereby hold the beverage can to the sealing lid.

It will be realised that in the presently described preferred embodiment, concentric rims 25, 27 and lateral lip 35 comprise a first engagement means for a beverage can having a lid end of a smaller diameter. Similarly, concentric rims 27, 29 and lateral lip 37 comprises a second engagement means.

Upon a can end crimping ridge being received into either the smaller recess 31 or the larger recess 33, outer skirt 23 locates about the outside of the top portion of the can. Care needs to be taken during this operation that the tab of the can has been opened and is lined up with pouring aperture 9 of the can lid.

The skirt 23 has an inner diameter sized to snugly fit over a standard beverage can so that it comes to rest over the top quarter or so of the beverage can.

Figure 8:
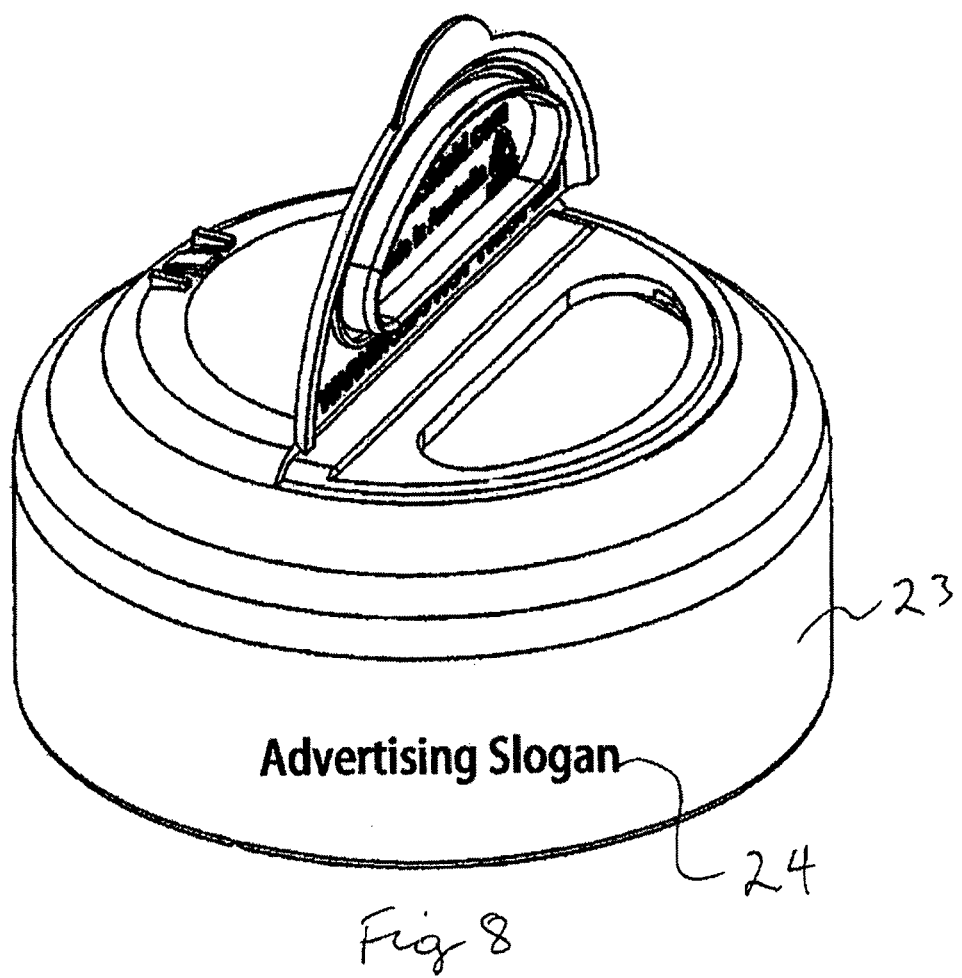
FIG. 8 is a further view of the lid of FIG. 8 shown bearing an indicia.

As shown in FIG. 8 the outside of the skirt 23 may be decorated with an indicia 24 such as an advertising slogan or the name, colours and/or logo of a particular sporting club or with other marketing or advertising markings as desired.

Figure 9:
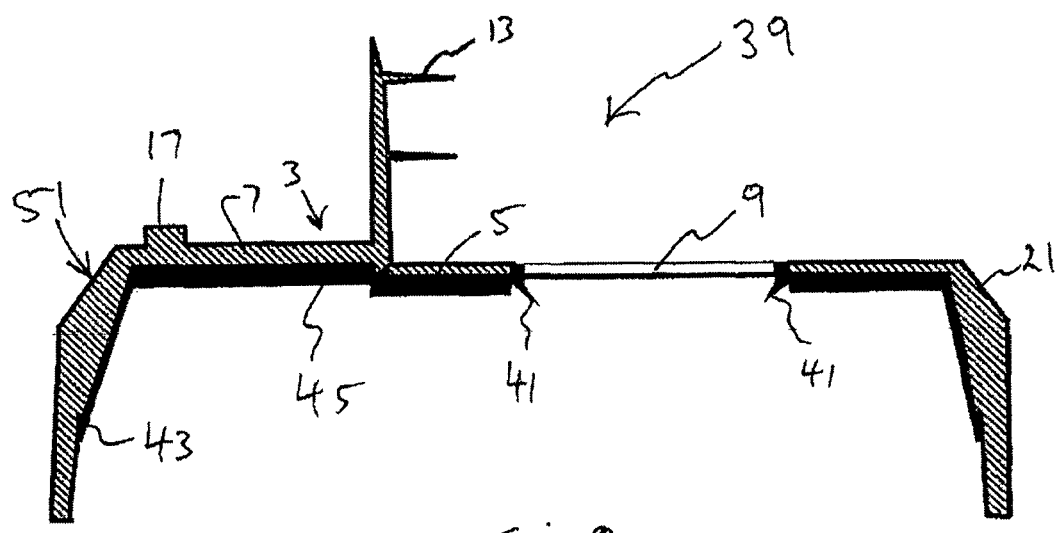
FIG. 9 is a cross sectional, and somewhat stylized, view of a beverage container lid according to a further embodiment of the present invention.

Referring now to FIG. 9 there is depicted a cross section of a further embodiment of a beverage container lid 39 according to the present invention.

The container lid 39 is formed of a hard plastic material as before. However, it does not have the ridges 25 and 27 and 29 of the previously described embodiment. Instead an inner lining of soft plastic 45 is coated on the inside surface of the lid 39.

As will be explained, the container lid 39 is produced in one piece thereby eliminating the manual process of fitting the O-ring 16, which was required for the previously described embodiment. Instead, in the further embodiment, upon closure the D-shaped rim 13 passes though the pouring aperture 9 and then passes through a correspondingly shaped wiper 41 that is integrally formed with the inner lining of soft plastic 45.

Furthermore, during fitting to a can, the lower limit 43 of the soft plastic 45 makes contact with the shoulder of the can and thereby provides a sealing point of contact with the can. Consequently the lid 39 is able to seal with cans of both small and larger diameter rims since sealing occurs around the upper shoulder of the can as well as against the top of the rims of the can. It will be understood that the lid 39, due to inclusion of the soft plastic inner liner 45 is able to accommodate minor manufacturing tolerances in can rim sizes.

Figure 10:
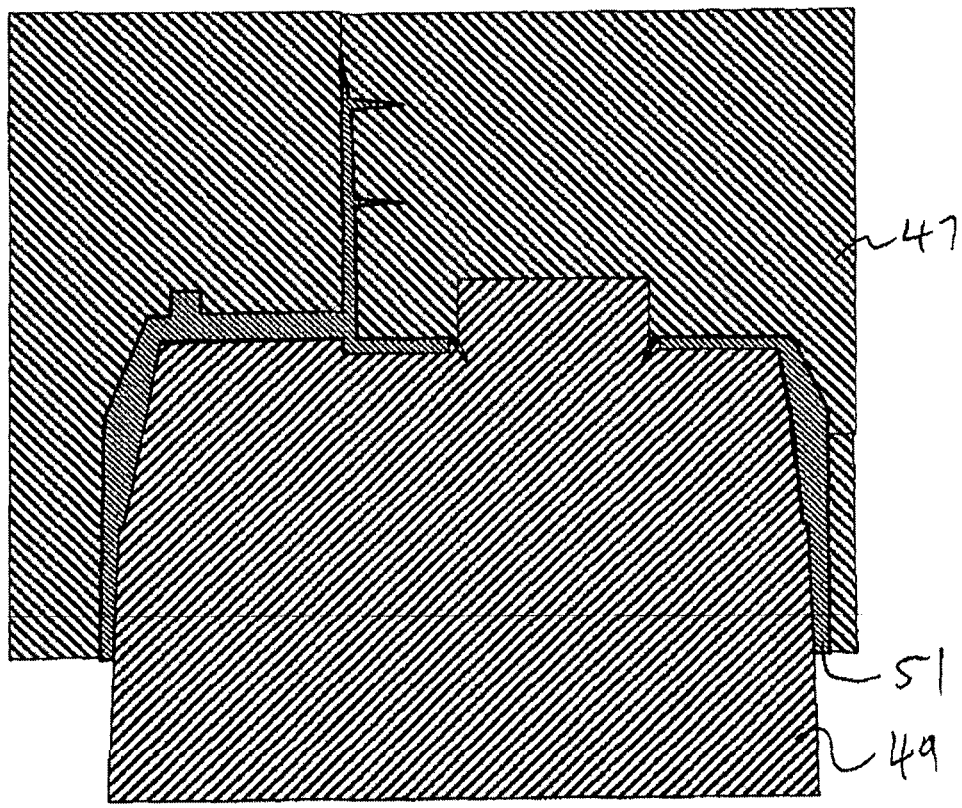
FIG. 10 is a cross sectional view of a mould during a first stage in the production of the container lid of FIG. 9.
Figure 11:
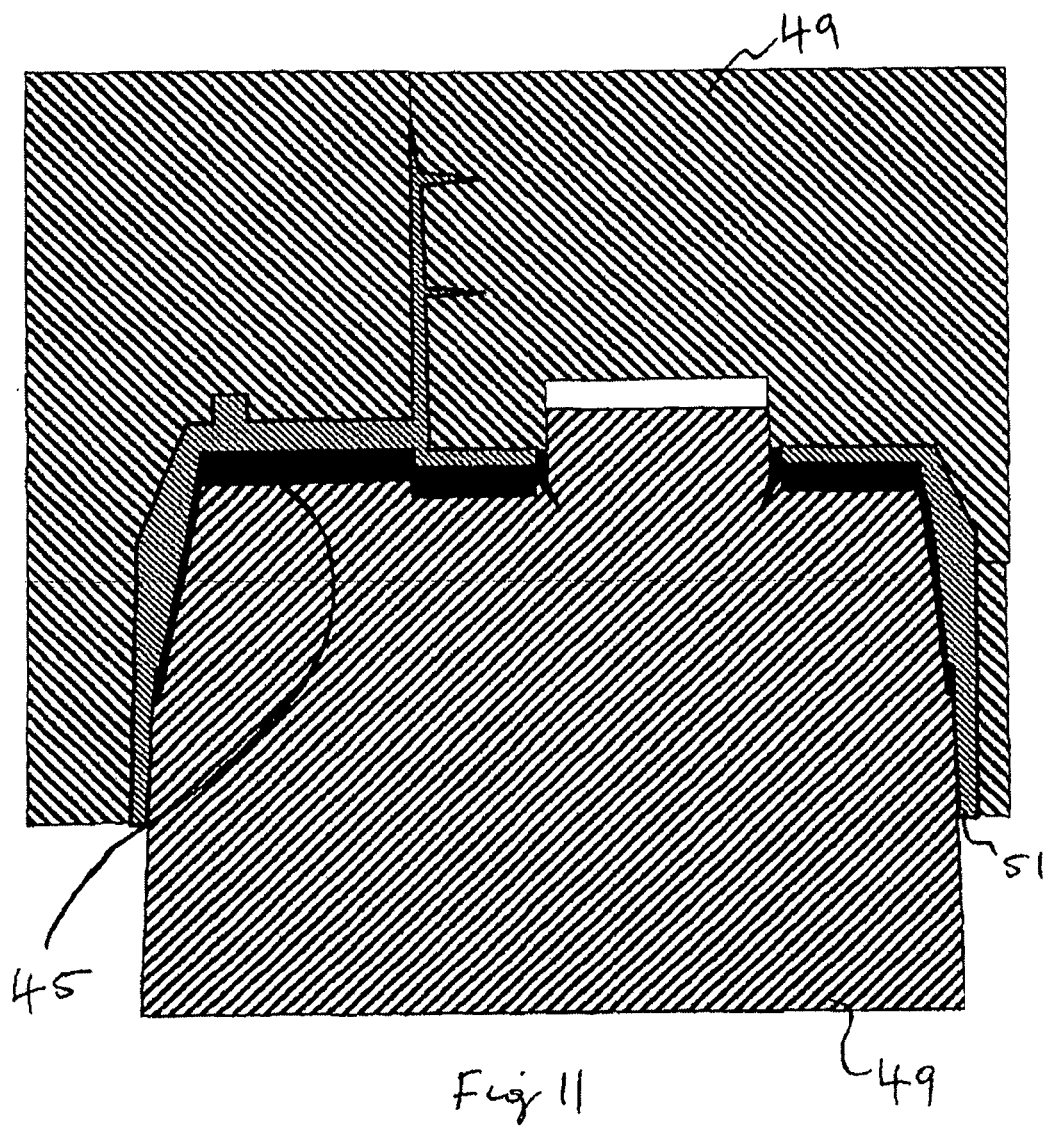
FIG. 11 is a cross sectional view of a mould during a second stage in the production of the container lid of FIG. 9.

Referring now to FIGS. 10 and 11 a sequence for moulding the lid of FIG. 9 will be described.

With reference to FIG. 10, initially a suitably shaped mould outer casing 47 and complementary core 49 are brought adjacent to each other as shown in the Figure. Hard plastic is then injected between core 49 and outer casing 47 in order to form the hard plastic outer layer 51 of lid 39.

Referring now to FIG. 11, after the hard plastic has sufficiently cooled, core 49 is retracted away from the hard plastic layer 51 a distance corresponding to the thickness of the desired layer of the soft plastic inner lining 45. Soft plastic is then injected into the space between the hard plastic layer 51 and the core 49 in order to form the inner lining 45.

The core 49 is then sufficiently displaced in order to allow for the finished lid 39 to be discharged from the mould.

Figure 12:
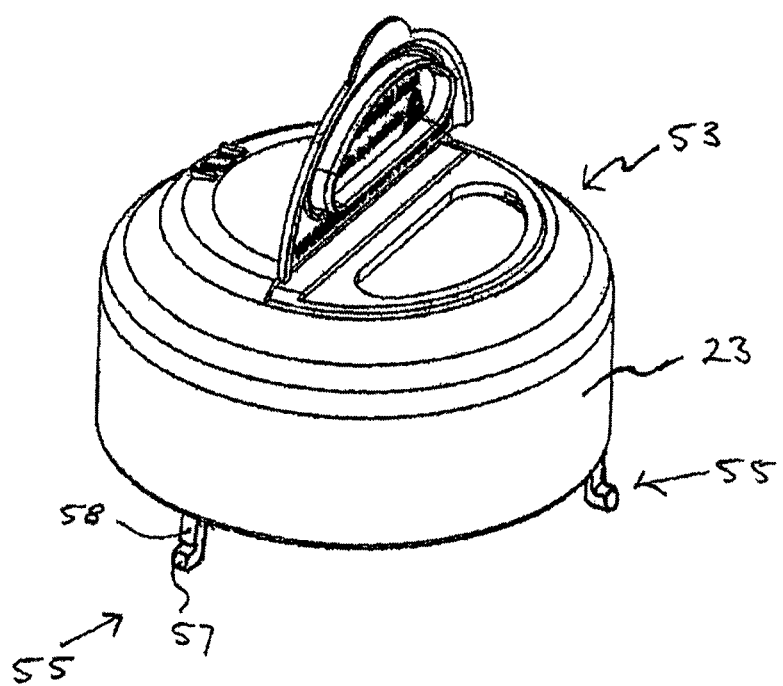
FIG. 12 is a perspective view of a further embodiment of a lid according to an embodiment of the present invention.

Referring now to FIG. 12, a beverage container lid 53 is depicted. The lid 53 is the same as the embodiment that was previously described in relation to FIGS. 1 to 8 except that it includes four locking pins 55, of which two are visible in the Figure. The four locking pins 55 are equispaced around the lid and extend downward from the lower limit of skirt 23. Each locking pin 55 comprises a vertical stem portion 58 which terminates at its lower end in a right angled stub 57 that extends radially outward.

Figure 13:
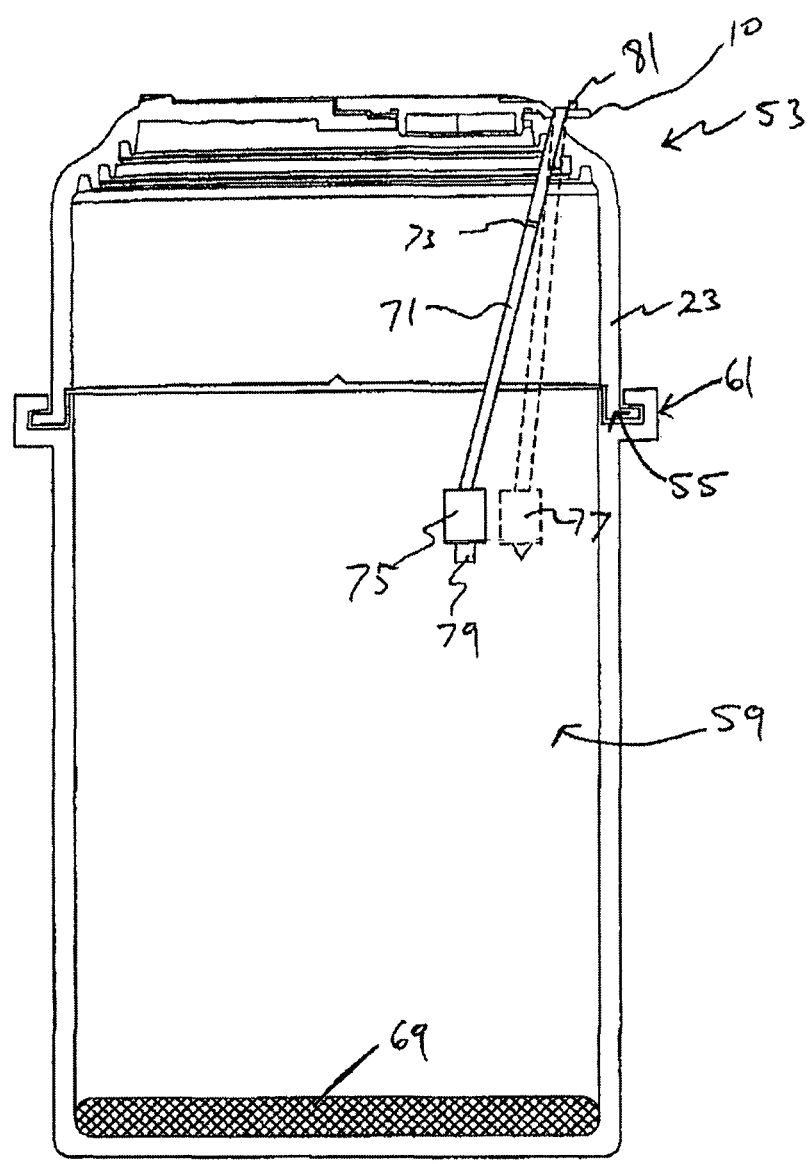
FIG. 13 is a perspective view of the embodiment of FIG. 12 in combination with a container for the lid and showing a tamper indicator according to an optional feature of the present invention.

With reference to FIG. 13 the locking pins 55 are provided to make a bayonet type attachment between the lid 53 and a container 59. The container 59 is shaped to snugly receive the lower portion of a beverage can. Together with the lid 53 the container encapsulates the beverage can. Each locking pin 55 is engaged by a complementary locking formation 61 formed into the periphery of the container's mouth.

Figure 14:
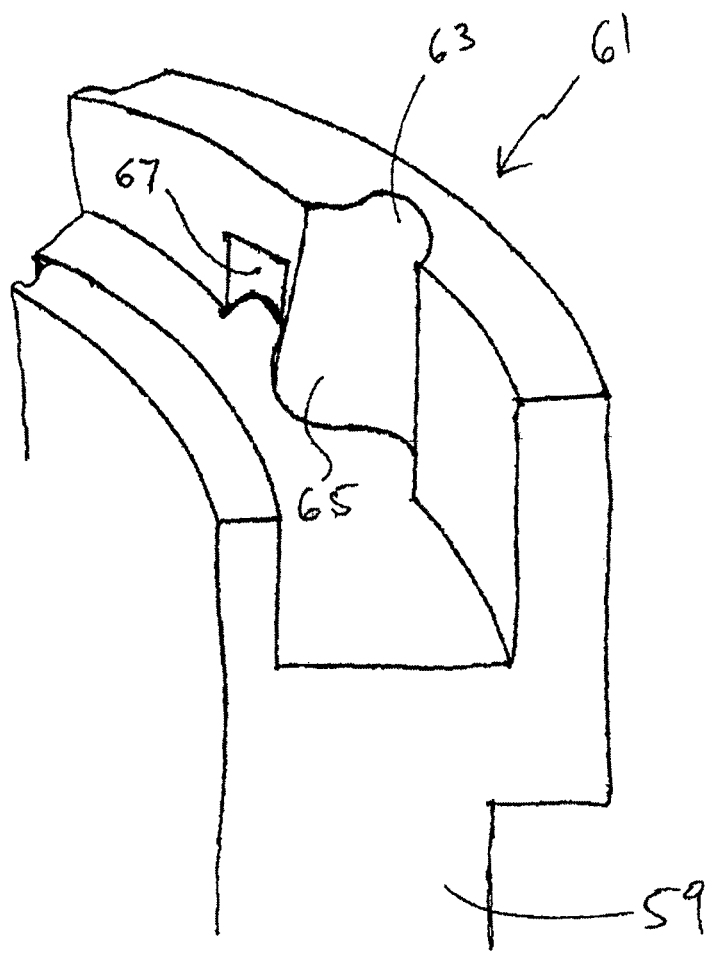
FIG. 14 is a close up detail of an engagement formation of the container of FIG. 13.

FIG. 14 is a perspective detail view of the locking formation 61. It includes a vertical channel 63 for receiving the locking pin 55, including the stem 58 and stub 57. The lid is rotated relative to the container 59 so that the stem 58 is pushed sufficiently inward against curved wall 65 to allow for the stub 57 to be received into recess.

At the bottom of the container 59 there is located a resilient pad 69, for example of spongy foam. The pad 69 is provided to press a can located within the container 59 upward so that it in turn presses against the lid 53 thereby ensuring that stubs 57 press upward against the ceiling of locking recess 67 in order that play between lid 53 and container 59 is reduced.

It will be realised that other methods for securing the lid 53 to the container 59 are possible. For example a threaded connection between the two might also be used as a fastening mechanism.

Figure 15:
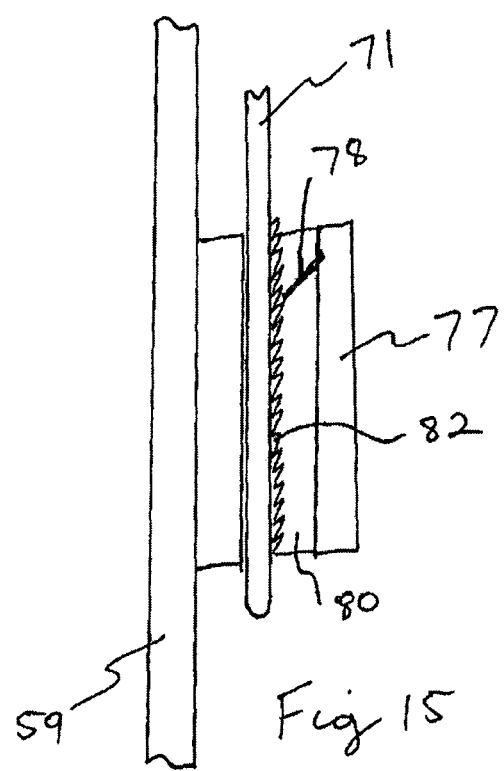
FIG. 15 is a partially cutaway detail showing the internal configuration of a locking formation of the arrangement shown in FIG. 13.
Figure 16:
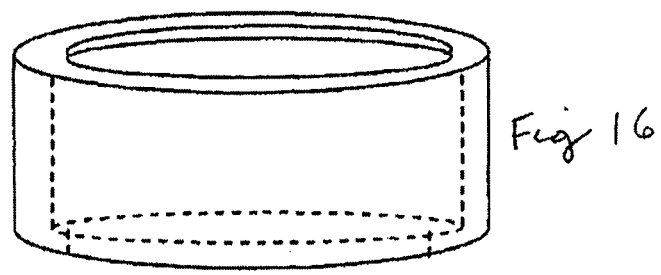
FIG. 16 is a perspective view of a tubular holder for a web of printed material.

Referring again to FIG. 13, a tamperproof arrangement is provided in the form of a band 71 having a line of weakness 73 formed across it. The band 71 is captured at either end by anchor formations 77. The anchor formations in the presently described embodiment comprise blocks formed outwardly on the outside of container 59 with vertical slots therethrough for the passage of the band. As best seen in the partially cutaway detail of anchor formation 77, shown in FIG. 15, a catch 78 extends downwardly from an internal wall of formation 77 and into the slot 80. The catch 78 cooperates with sawtooth profile ribs 82 formed across the band so that the band may enter, but not leave anchor formation 77. An oversized stop 79 is integrally formed at the opposite end of band 71 to prevent the band being pulled through the slot of engagement formation 75. A protrusion 81 on the top of tab 10 is provided to retain the band on the tab.

In use, a user of the container 59 and lid 53 shown in FIG. 13 firstly opens a can of beverage and then inserts it into the container 59 so that the base of the can of beverage rests upon pad 69. The user then places the lid 53 over the top of the can and locates locking pins 58 over vertical channel 63 of the container's locking formations 61. The lid is then pressed down on the top of the can, thereby overcoming the upward force due to the pad 69 on the bottom of the can and rotated so that the stubs 57 of the locking pins 55 are received into locking recesses 67.

The band 71 is then threaded through the slot of anchor formation 75, over thumb tab 10 and inside guide 81 and then through the slot of anchor formation 77 wherein the catch that is located therein locks against the ribs formed across the band 71 to thereby hold it in place.

In the event of another person tampering with the lid by forcing the thumb tab 10 upward, the band 71 will break across its line of weakness 73, which will be immediately apparent to the legitimate user.

The bands are preferably supplied with a multiplicity of different identifiers printed upon them so that they cannot be easily substituted by an unauthorised person. Obviously other frangible members might be used instead of the bands that have been described.

Figure 17:
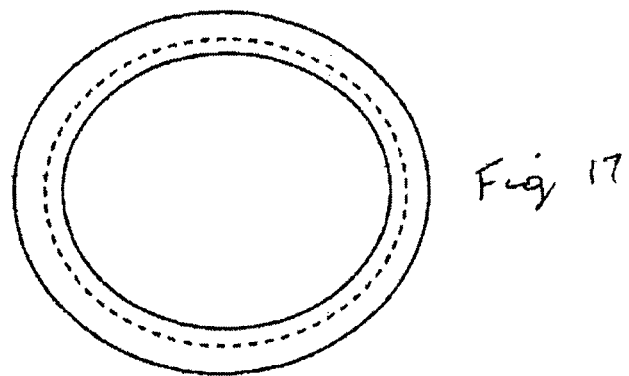
FIG. 17 is a top plan view of the web holder of FIG. 16.
Figure 18:
FIG. 18 depicts a web of printed material for insertion in the holder of FIG. 16.

In order that users of the lids be able to readily customise them, in one embodiment the lid may be produced in clear plastic with a slot or recess formed in the skirt wall for a printed substrate to be inserted therein. However, polypropylene, which is a preferred material for making the lid, is not transparent enough to allow a quality image to be seen through it. Accordingly, as shown in FIGS. 18 and 17, a clear tubular plastic holder may be provided that slides snugly over the skirt 23. The holder has an inward rim around its inner top periphery which comes to rest on the shoulder 21 of the lid.

Figure 19:
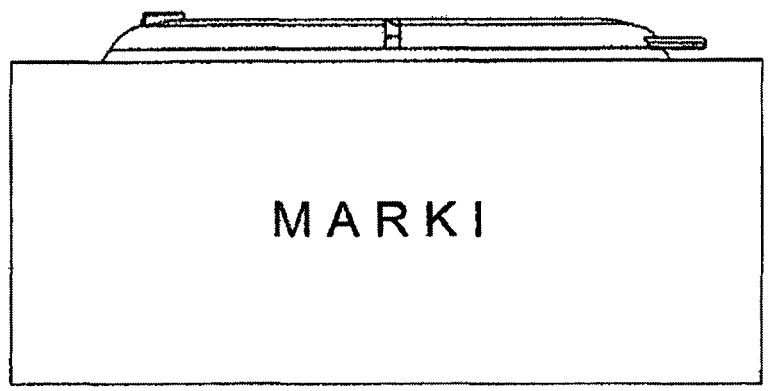
FIG. 19 is a side plan view of the holder installed on a lid with the web visible through a clear wall of the holder.

Prior to placing the plastic holder over the lid a web of printed material, as shown in FIG. 18, is inserted into a recess formed around the inner wall of the holder. Accordingly, the printed material can then be seen through the wall of the tubular holder subsequent to its installation over the lid, as shown in FIG. 19.

While the invention has been primarily described in relation to beverage cans it also finds application with other types of beverage containers. For example, embodiments of the invention may be applied to coffee cups and the like.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A container and a beverage container sealing lid including:
   a pouring aperture;
   a hinged closure arranged to seal the aperture;
   an engagement assembly on an inside of said lid for engagement with beverage containers having can ends of first and second diameters; and
   a skirt for locating about the beverage container wherein the skirt depends downward for a distance so that an area is provided for the skirt to bear markings;
   a retaining arrangement for holding the hinged closure open; and
   a tamper indicator member having opposing portions fastened with the container and having an intermediate portion taut over the hinged closure in a closed configuration.

2. A beverage container sealing lid for attachment to beverage containers including a circular upstanding crimping ridge of a first diameter, said sealing lid including:
   a pouring aperture;
   a hinged closure arranged to seal the aperture;
   an engagement assembly on an inside of said lid including a first circular vertical recess having a first diameter, said recess being arranged to receive said upstanding crimping ridge;
   a skirt for locating about the beverage container wherein the skirt depends downward for a distance so that an area is provided for the skirt to bear markings;
   a retaining arrangement for holding the hinged closure open; and
   an insertable tamper indicator member having opposing portions configured to be fastened with a container and having an intermediate portion taut over the hinged closure in a closed configuration configured to break upon the hinged closure being opened.

3. The beverage container sealing lid of claim 2, wherein the engagement assembly on the inside of said lid further includes a second circular vertical recess having a second diameter arranged to receive a circular upstanding crimping ridge of a second diameter.

4. The beverage container sealing lid of claim 3, further comprising first and second lateral lips extending inwardly into the first and second recesses respectively for engagement with first and second indentations around bases of the crimping ridges.

5. The beverage container sealing lid of claim 2, further comprising a platform stepped with an upper tier and a lower tier wherein the pouring aperture is formed through the lower tier.

6. The beverage container sealing lid of claim 5 wherein the hinged closure is formed with a rim for snug reception within the aperture.

7. The beverage container sealing lid of claim 6, wherein an O ring is retained around the rim for improved sealing.

8. The beverage container sealing lid of claim 5, wherein a shoulder extends downward and outward from the platform.

9. The beverage container sealing lid of claim 8, wherein the skirt depends from the shoulder.

10. The beverage container sealing lid of claim 2, wherein an outer side of the skirt bears indicia.

11. The beverage container sealing lid of claim 2, wherein the retaining arrangement includes a first part formed on the hinged closure to cooperate with a second part of said arrangement formed upon an outside of said lid.

12. The beverage container sealing lid of claim 11, wherein the retaining arrangement includes diverging wings formed on the hinged closure or an outside of the lid and a complementary recess formed on the outside of the lid or the hinged closure.

* * * * *